(12) United States Patent
Preiss

(10) Patent No.: US 7,406,358 B2
(45) Date of Patent: Jul. 29, 2008

(54) KANBAN CONTROL CYCLE SYSTEM

(75) Inventor: Martin Preiss, Karlsruhe (DE)

(73) Assignee: SAP Aktiengesellschaft, Walldorf (DE)

( * ) Notice: Subject to any disclaimer, the term of this patent is extended or adjusted under 35 U.S.C. 154(b) by 0 days.

(21) Appl. No.: 11/171,865

(22) Filed: Jun. 30, 2005

(65) Prior Publication Data

US 2007/0005411 A1    Jan. 4, 2007

(51) Int. Cl.
*G06F 19/00* (2006.01)
(52) U.S. Cl. .............................. 700/99; 700/107; 705/8
(58) Field of Classification Search ........... 700/99–107; 705/8–10, 28
See application file for complete search history.

(56) References Cited

U.S. PATENT DOCUMENTS

| | | | |
|---|---|---|---|
| 6,151,582 A | * | 11/2000 | Huang et al. .................... 705/8 |
| 2003/0014314 A1 | | 1/2003 | Griep et al. |
| 2003/0078831 A1 | * | 4/2003 | Kuettner et al. ................ 705/10 |
| 2005/0261954 A1 | * | 11/2005 | Aoyama et al. ................ 705/10 |
| 2006/0015416 A1 | * | 1/2006 | Hoffman et al. ............... 705/28 |

OTHER PUBLICATIONS

Qiu et al., Distributed WIP control in Advanced semiconductor manufacturing, 2002, IEEE ASMconfrernce, p. 49-45.*
Pattita Suwanruji, A Simulation Test Bed For Production and Supply Chain Modeling, Dept. of Mechanical Manufacturing Engineering, 2003, p. 1174-1182.*
Desrochers A. A. et al., "Complex Token Petri Nets", 2003 IEEE International Conference on Systems, Man and Cybernetics, vol. 5 of 5, Oct. 5, 2003, pp. 1153-1160.
Matta A et al., "Analysis of assembly systems controlled with kanbans", European Journal of Operational Research, Amsterdam, NL, vol. 166, No. 2, May 11, 2004, pp. 310-336.
Proth J-M, "Petri nets for modeling and evaluating deterministic and stochastic manufacturing systems", Proceedings of the Seventh International Workshop on Saint Malo, France Jun. 3-6, 1997, Los Alamitos, CA, USA, IEEE, Jun. 3, 1997, pp. 2-14.

* cited by examiner

*Primary Examiner*—Kidest Bahta
(74) *Attorney, Agent, or Firm*—Fish & Richardson P.C.

(57) ABSTRACT

Modeling a process chain includes mapping processes in the process chain to control cycles, defining states for the control cycles, and defining couplings between states in different control cycles such that a state change in one control cycle causes a state change in another control cycle. The control cycles may be Kanban control cycles.

21 Claims, 7 Drawing Sheets

| | A | B | C | D |
|---|---|---|---|---|
| 204 | S | E | | |
| 206 | | S | E | |
| 208 | | | S | E |
| 210 | S | | E | |
| 212 | S | | | E |
| 214 | E | | S | |
| 216 | E | | | S |

FIG. 3

KANBAN CONTROL CYCLE SYSTEM

TECHNICAL FIELD

This patent application relates generally to Kanban control cycles and, more particularly, a system that uses Kanban control cycles to replenish items.

BACKGROUND

"Kanban" is a Japanese term that means signal. Kanban is one of the primary tools of a just-in-time manufacturing system (meaning a planning system for manufacturing processes that optimizes availability of material inventories at a manufacturing site to only what, when and how much is necessary). Kanban signals a replenishment process for production and materials, and maintains a generally orderly and efficient flow of materials throughout a manufacturing process. Kanban may be implemented via a printed card that contains specific information such as item name, description, quantity, etc.

Kanban control cycles define a replenishment process in terms of operational states. A Kanban control cycle can be characterized as a sequence of different operational states. Kanban control cycles occur between a supplier and a consumer, i.e., the one replenishing an item and the one requesting that the item be replenished, respectively. The item can be any kind of material, such as a component or an assembly, that needs to be replenished. In a Kanban control cycle, a signal indicating that the material needs to be replenished is sent from the customer to the supplier. This signal, called the Kanban, may be part of an electronic message or an actual physical device, such as a card. The operational state of the Kanban may be modified to provide item-related information, as described below.

By way of example, a material may be needed by a consumer for use in a machine or process. As a result of this need, an operational state of the Kanban is set from "full" to "empty". The consumer therefore sends a Kanban to a supplier instructing the supplier to provide more of (e.g., a specified amount of) the material. In this example, the Kanban identifies the material, the amount of the material, and the consumer. After the Kanban arrives at the supplier, the supplier processes the order and sends the material to the consumer. The state of the Kanban is then changed from "empty" to "full".

States of a Kanban correspond to states of a cycle that is performed to replenish an item. Electronic Kanban systems associate a state change of a Kanban with related electronically-controlled actions, such as printing Kanban cards, visualizing replenishing scenarios, creating and sending replenishment orders (e.g. electronically transmitting a purchase order to a supplier), and updating inventory levels.

Existing Kanban control cycles operate on an item-by-item basis, making it difficult to address more than one item at a time. This can be problematic, particularly in situations, such as supply chains, where the supply of one item depends on the supply of another item.

SUMMARY

This patent application describes methods and apparatus, including computer program products, for using a Kanban control cycle to monitor a production system.

In general, in one aspect, the invention is directed to modeling a process chain, and includes mapping processes in the process chain to control cycles, defining states for the control cycles, and defining couplings between states in different control cycles such that a state change in one control cycle causes a state change in another control cycle.

The foregoing aspect may include designating one of the control cycles to be a leading control cycle, designating one of the control cycles to be a dependent control cycle, and defining a coupling between the leading control cycle and the dependent control cycle such that a state change in the dependent control cycles is caused by a state change in the leading control cycle. The control cycles may be defined in a software system for supporting material flow in the process chain. The control cycles may be Kanban control cycles. The couplings between states may be defined using a matrix that indicates an effect of a state in one control cycle on a state in another control cycle.

A consistency rule may be defined. The consistency rule may ensure correct relationships between states in at least one of the dependent control cycle and the independent control cycle. An error state may be defined in at least one of the control cycles. An error state of a first control cycle may be linked with an error state of a second control cycle. At least one of the states may be defined in at least one Kanban card. The state sequence may be defined by at least one set of states of different control cycles having at least one state coupling type.

The details of one or more examples are set forth in the accompanying drawings and the description below. Further features, aspects, and advantages of the invention will become apparent from the description, the drawings, and the claims.

DESCRIPTION OF THE DRAWINGS

FIG. 3 shows a state sequence matrix of the leading control cycle.

Like reference numerals in different figures indicate like elements.

DETAILED DESCRIPTION

Kanban control cycles provide a method to monitor, control, support, and automate production and supply chain management for items, based on the physical inventory of items during manufacturing. Items that are necessary during production may be readily available in small quantities. Replenishment of such items can be initiated via a Kanban control cycle by issuing a Kanban control card (referred to herein as "the Kanban"). In this embodiment, the Kanban describe the items to be supplied, the quantity of the items, and the customer, meaning to whom the items are to be delivered.

The application describes a system, in particular software, for use in controlling replenishment processes for related items using Kanban control cycles. Briefly, the software described herein maps a replenishment process of each item into a corresponding control cycle, defines at least two operational states (or simply, "states") for each cycle, defines a state sequence for each control cycle, and defines a state sequence coupling between control cycles such that a change in state of a replenishment process of one item triggers a corresponding change of state of a replenishment process of a related item. Such changes of state can include, but are not limited to, printing Kanbans, updating monitoring displays, and creating or updating procurement orders, inventory levels, etc.

A process called "rigid coupling" may be used to effect state sequence coupling in Kanban control cycles. According to this process, one control cycle is designated the "leading control cycle", and at least one other control cycle is designated the "dependent control cycle". State sequences coupling are coupled in that any state within one of the dependent control cycle is caused by at least one state in the leading control cycle.

Another process, called "loose coupling", may be used to effect state sequence coupling in Kanban control cycles. According to this process, two Kanban control cycles, CC1 and CC2, can be coupled loosely using a state sequence coupling, which constitutes a collection of state sets. Each state set includes a state in a state sequence of CC1, a state in a state sequence of CC,2 and a "state coupling type". The state coupling type controls whether the coupling between two cycles is bidirectional (change of state in CC1 triggers a change of state in CC2, and vice versa) or one-directional, and whether a change in state of one control cycle, e.g., CC2, must be being triggered by another control cycle, e.g., CC1.

Figure 1:
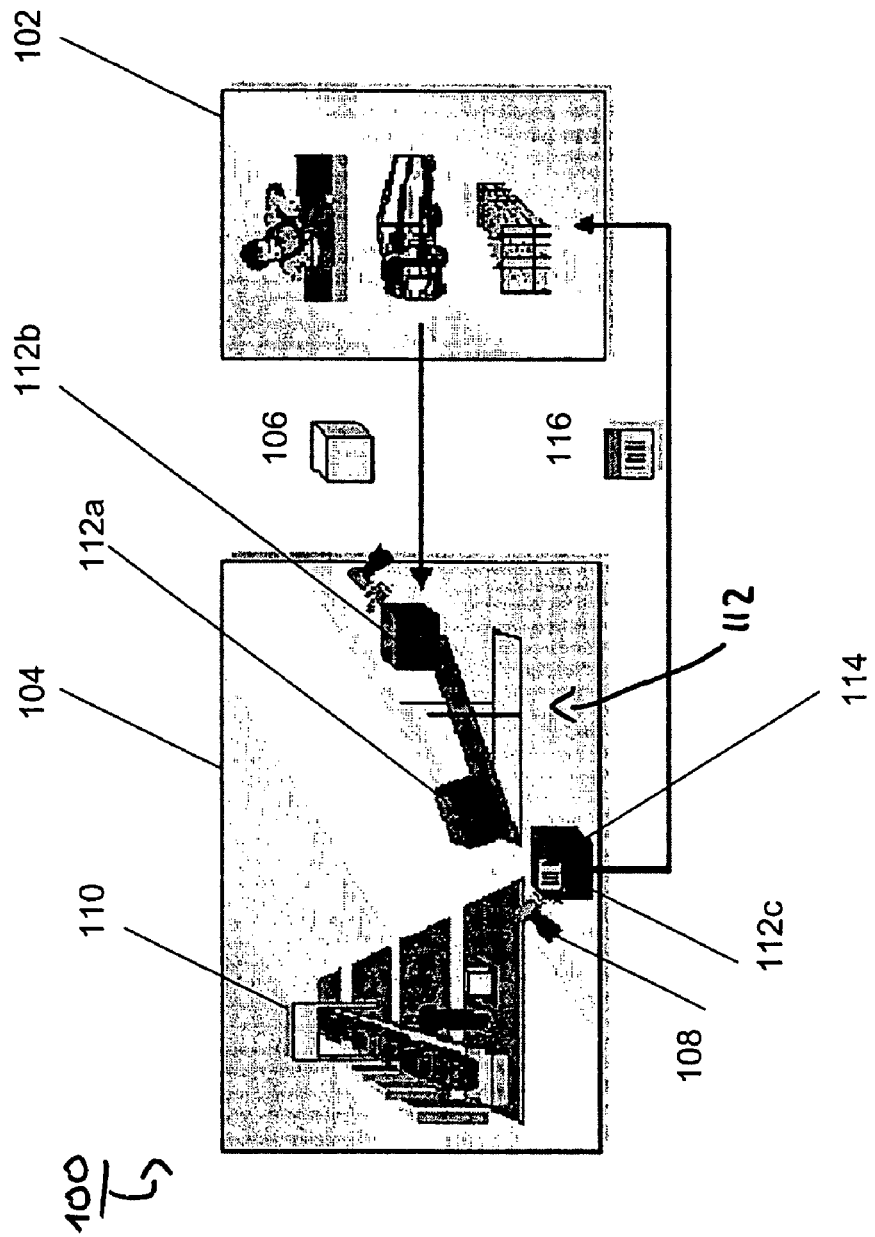
FIG. 1 shows a supply chain monitored by a Kanban control cycle.

FIG. 1 illustrates a supply chain 100 for items 112. FIG. 1 shows a consumer 104 that requires items 112, and a supplier 102 that provides item 112. Items 112 are 20 transported between supplier 102 and consumer 104 in containers 106.

Items 112 are used in a production line 110. Several items 112a, 112b can be kept in stock. Each item 112c used in production line 110 is scanned by a barcode scanner 108. By scanning items 112 when used, stock of items 112 is monitored electronically.

The supply chain of items 112 shown in FIG. 1 is controlled by an event-controlled Kanban control cycle. In an event-controlled Kanban control cycle, replenishment of items 112 can be correlated to item requirements. Thus, items 112 can be made available only when items 112 are needed, e.g., stock of an item is below a minimum level.

In this implementation, a current stock level is described by control cycle states "full" and "empty". A request for an item can be triggered by an event, such as scanning a last item 112 in stock. At this point, the control cycle state may be set to "empty". When the state is "empty", a Kanban 116 (e.g., a card) is generated and sent to the supplier 102.

The supplier 102 receives the Kanban and extracts replenishment information concerning item 112 from Kanban 116. The replenishment information can be obtained by scanning a barcode on the Kanban. The barcode is linked to master data the customer's database. The master data can contain, e.g., information pertaining to (e.g., identifying) the item and replenishment requirements pertaining to the item. As noted, items 112 are sent in containers 106 from supplier 102 to consumer 104.

When the consumer 104 receives the requested items, the consumer can process the items automatically, e.g., scanning a barcode on the each container 106. Information from the barcode can be used by a computer system (not shown) at the consumer to update the database, and thereby keep track of items 112. The state of the control cycle for item 112 can then be set to "full". Kanban 116 can then be deactivated/deleted/destroyed.

Thus, using Kanban control cycles, manufacturing processes can be controlled and automated, thereby reducing manual intervention in the process. As noted, a computer system may be used to provide Kanban control cycles for items that are coupled to each other. What is meant by coupling here is that a state of a first control cycle can cause, or can be caused by, a state of a second control cycle. Coupling of a plurality of control cycles extends automatic replenishment to plural items, as illustrated below.

Figure 2:
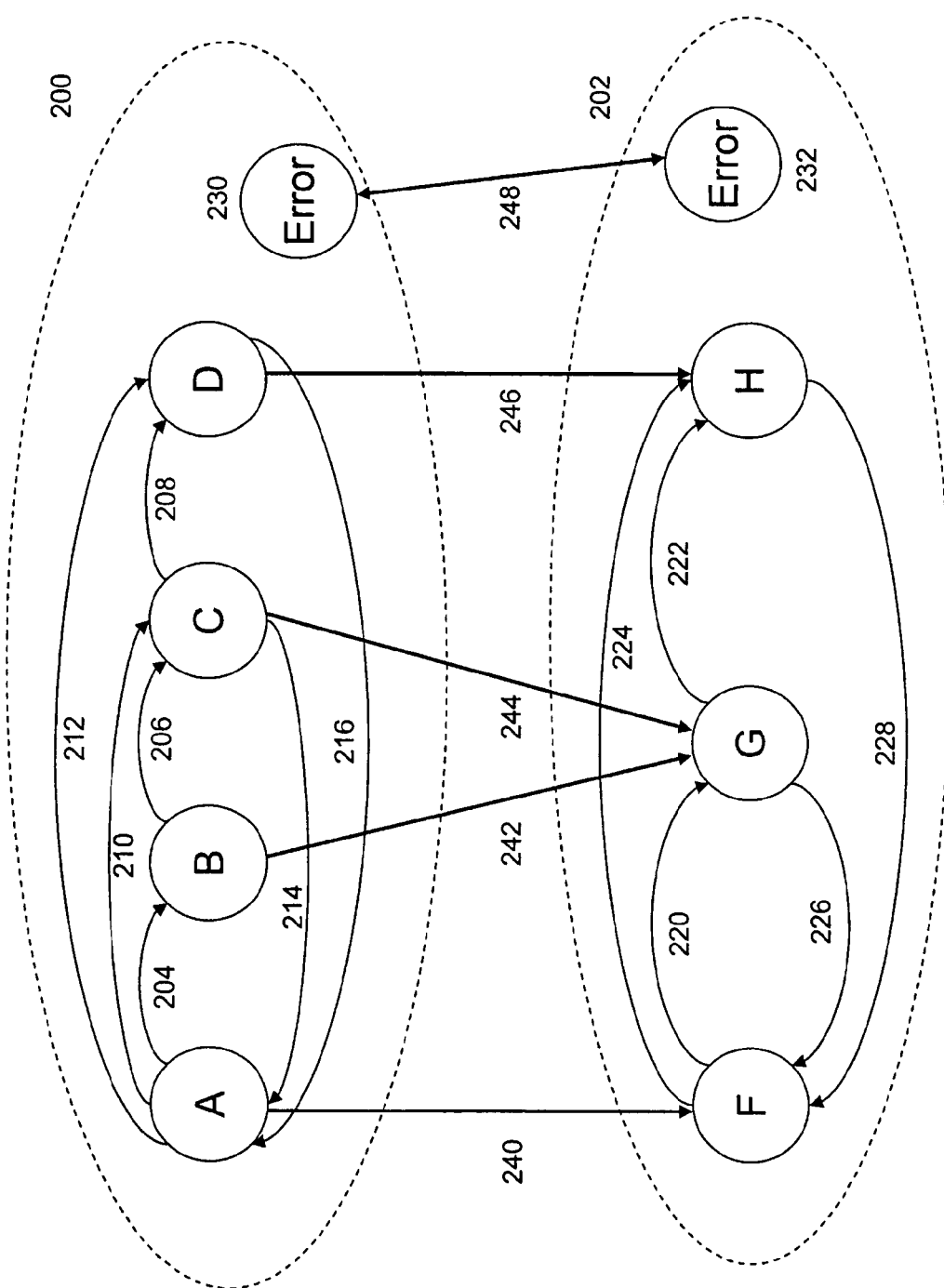
FIG. 2 shows a state sequence chart for a leading control cycle and a dependent control cycle in the Kanban control cycle.

FIG. 2 shows state sequence charts for a leading control cycle 200 and a dependent control cycle 202. Leading control cycle 200 is defined by four different states: A, B, C and D. State changes are defined by state transitions 204 to 216. For example, a state change from A to B is defined by transition 204. A state change from C to A is defined by transition 214. Dependent control cycle 202 has three states: F, G and H. State changes are defined by state transitions 220 to 228. State changes in dependent control cycle 202 are triggered (in this example, exclusively) by a coupling 240 to 248.

In this embodiment, the coupling between leading control cycle 200 and dependent control cycle 202 is a rigid coupling (as defined above). Dependent control cycle 202 is not able to change its states F, G, H until a new state in leading control cycle 200 is achieved. The supply chain containing the leading and dependent control cycles can include items that are always used in combination. The state coupling can be stored a state coupling type.

By way of example, a garage may need to be supplied regularly with spare motors and parts from a central storage facility. In this example, spare motors and parts can be transported in a single container, and constitute items of a Kaban control cycle. Using a Kanban control cycle, replenishment of each item can be controlled separately. However, while the Kanban control cycles are independent, each Kanban control cycle is triggered individually, i.e., a Kanban is generated for each item. This can be problematic because it requires manual intervention, which can be error prone.

Coupling control cycles 200 and 202 can reduce the amount of manual interaction required to replenish the items. For example, each time spare motors need to be replenished, corresponding replacement parts therefor can also be ordered. A Kanban "impulse" can constitute scanning of an order code. This impulse can trigger leading control cycle 200 to change its state from D "full" to B "empty". The dependent control cycle thereby is triggered to also change its state from H "full" to F "empty".

Two Kanban cards, one for each item (motors and parts), are generated by the consumer and provided to the supplier. In this example, the supplier can produce the items and send them back to the consumer in one container. At the consumer's site, the container can be scanned, e.g., by a barcode scanner. Following scanning, or in response thereto, the state of the leading control cycle 200 can be set to D, "full". Because the two cycles are coupled, the state of dependent control cycle 202 is also set to H "full". Leading control cycle 200 and dependent control cycle 202, and the coupling between them, can be customized once in order to automate combined processing in any manner desired.

State changes of control cycles can be subject to certain restrictions. While customizing the control cycles, the state sequences can be defined. Exemplary states of control cycle 202 may be "wait" (A), "empty" (B), "in process" (C), and "full" (D). Additional states can be "in transit" or "in use", each describing a temporal state of an item. "Wait" can indicate that the material is used up, but that replenishment is not yet required. "In process" can indicate that the requested item is currently in production. "In transit" can indicate that an item is on its way from the supplier to the consumer. "In use" can indicate that the item is currently being used by the consumer.

An error state "error" 230, 232, which indicates a process error, can be used in each control cycle 200, 202. For example, "error" can indicate that a desired state could not be set successfully in a control cycle. Because control cycles 200, 202 are coupled, an error state in one of control cycles 200, 202 causes an error state in the other control cycle 200, 202. Errors typically need to be resolved manually.

FIG. 3 illustrates a state sequence matrix defining state changes of leading control cycle 200. In FIG. 3, the columns indicate states and the rows indicate state transitions. "S" indicates the start state of a state change and "E" indicates the end state of the state change. For example, the state change from "A" to "B" is represented by state transition 204; the change from "A" to "C" is represented by state transition 210; and the change from "C" to "A" is represented by state transition 214. The matrix facilitates customization of state changes between states "A" to "D" in leading control cycle 200.

Figure 4:
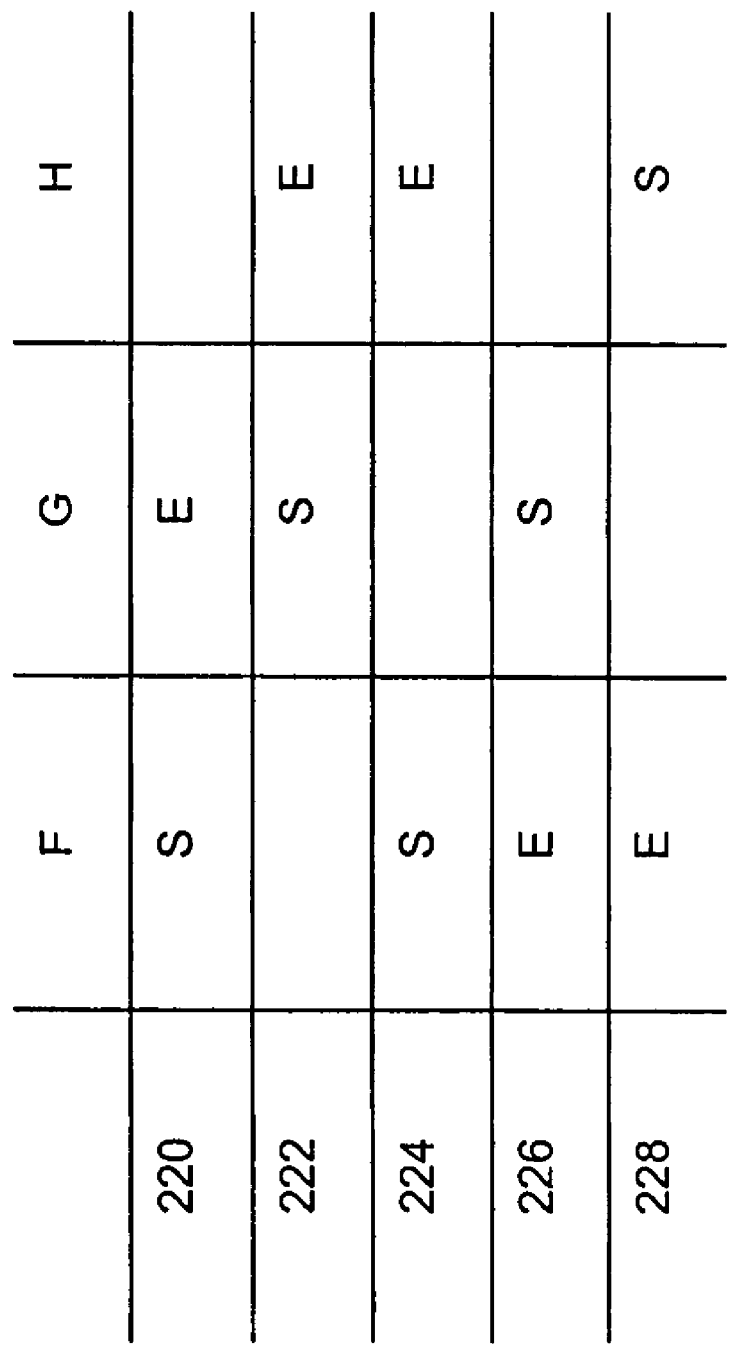
FIG. 4 shows a state sequence matrix of the dependent control cycle.

FIG. 4 illustrates a state sequence matrix defining state changes for dependent control cycle 202. As above, columns indicate states and rows indicate state transitions. "S" indicates a start state of a state change and "E" indicates the end state of a state change. For example, the state change from "F" to "G" is represented by state transition 220; the state change from "F" to "H" is represented by state transition 224; and the state change from "H" to "F" is represented by state transition 228. The matrix facilitates customization of state changes between states "F" to "H" in dependent control cycle 202.

Figure 5:
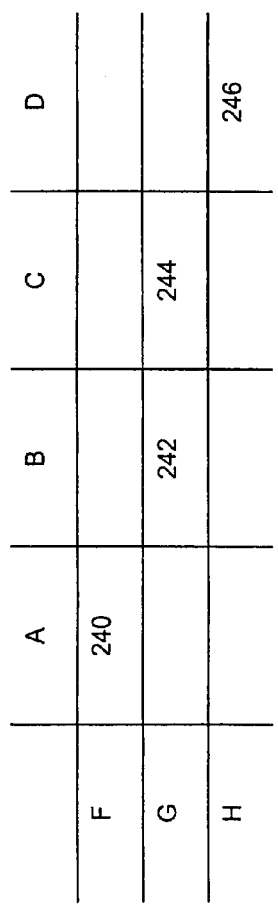
FIG. 5 shows a state sequence coupling between the leading control cycle and the dependent control cycle.

FIG. 5 illustrates a state sequence coupling matrix. In the matrix of FIG. 5, coupling between states of leading control cycle 200 and dependent control cycle 202 is customized. Each coupling 240 to 246 is assigned to a state "A" to "D" in the leading control cycle and a state "F" to "H" in the dependent control cycle. For example, coupling 240 is assigned to state "A" and state "F", thereby indicating a coupling between these states. The couplings customized in this matrix correspond to the couplings in FIG. 2.

A consistency check can be performed using the state sequence coupling matrix. From each coupling, the state of the leading control cycle is obtained. For coupling 244, this is state "C". State "C" can be changed into state "D" via state transition 208 in FIG. 3 and into state "A" via state transition 216 in FIG. 3. From the coupling matrix, it is also evident that state "D" is coupled to state "H" and state "A" is coupled to state "F". State "C" is coupled to state "G" through coupling 244. A state transition of state "C" can lead to states "A" or "D". In the dependent control cycle, this can lead to state changes from "G" to "F" or to "H". These changes are possible, as is evident from state transition 226 representing the state change from "G" to "F" and state transition 222 representing the change from "G" to "H" in FIG. 4. In this example, a state change from "D" to "C" would not be allowed. This is because, in the dependent control cycle, a state change from "H" (which is coupled to "D" through coupling 246) to "G" (which is coupled to "C" through coupling 244) is not available.

Figure 6:
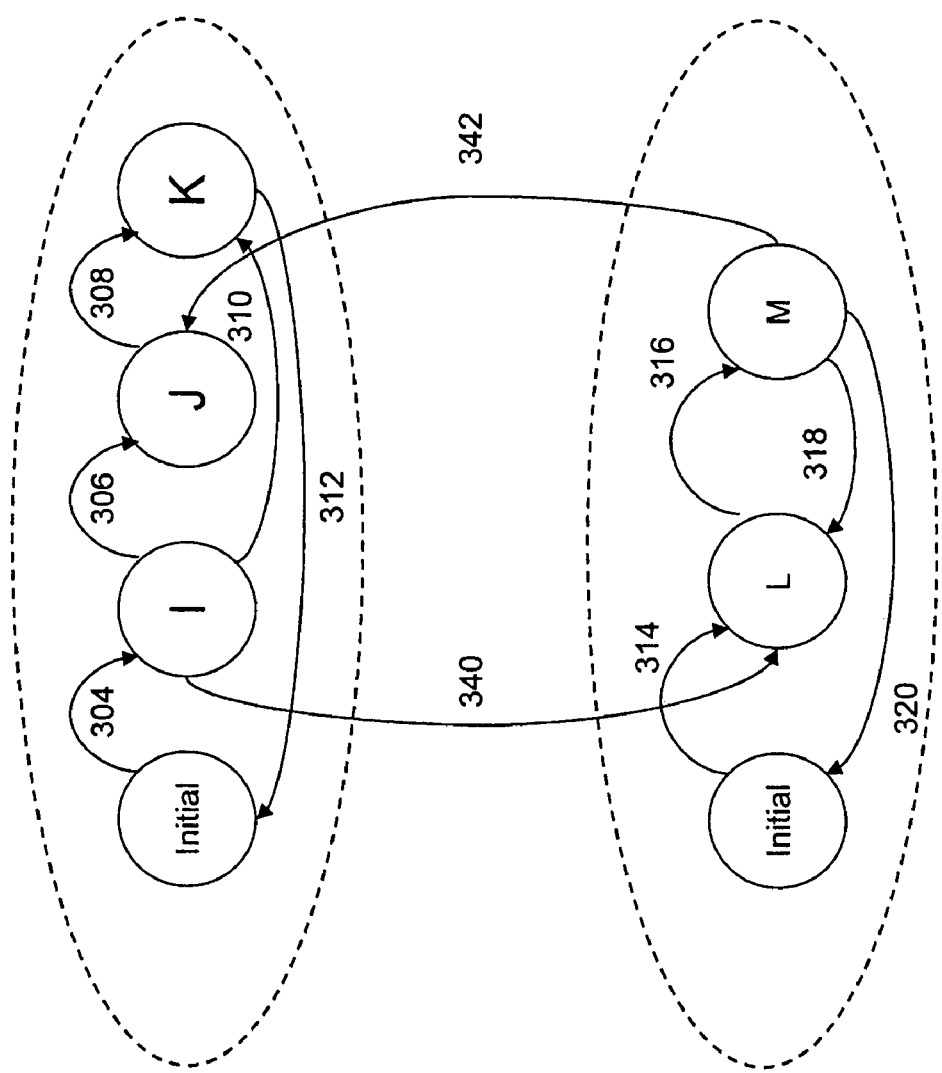
FIG. 6 shows state sequence charts for use in implementing loose coupling.

FIG. 6 illustrates a state sequence chart for a loose coupling between a control cycle 300 and a control cycle 302. This loose coupling between control cycles 300 and 302 can also be implemented in software executing on one or more computers. Control cycle 300 can have different states I, J, K and "initial". State transitions are permitted between the states "initial" and I 304, between states I and J 306, between J and K 308, between K and "initial" 312, and between I and K 310.

Control cycle 302 can also have different states "initial", L, and M. State transitions are permitted between "initial" and L 314, between L, and M 316, between M and L 318, and between M and "initial" 320.

A state coupling matrix may facilitate customization of couplings between control cycles 300 and 302. It is also be possible to store, in the state coupling matrix, a state coupling type indicating whether a coupling is bidirectional or one-directional. The state coupling matrix may also store one or more indications regarding to whether a state change can occur without being triggered by a coupling control cycle, or whether a state change must be triggered by another control cycle in order to occur.

By way of example, a one-directional state coupling between state I and state L 340 is possible. This might be useful if a replenishment order for an item, which is monitored by control cycle 300, causes an item controlled by control cycle 302 to be provided. Thus, if, in control cycle 300, a consumer order is received, control cycle 300 changes from its "initial" state to its "empty" state I in state transition 304. When control cycle 300 reaches state I, state L in control cycle 302 is triggered. Corresponding replenishment orders for the items can be generated and provided to suppliers. Which orders are generated depends on which items are controlled by control cycles 300, 302. Thereafter, the replenishment processes can run automatically without manual intervention.

It is possible to monitor the replenishment status of several items using Kanban control. For example, assume that an item controlled by control cycle 302 is necessary to produce an item controlled by control cycle 300. In this case, a state "full", which is represented by state M in control cycle 302, can cause (by way of an unidirectional state coupling 342) control cycle 300 to change its state from I to J, where state J corresponds to "in process". Control cycle 300 can proceed to state "K" once the item is provided.

With loose coupling, it is possible to provide one-directional or bidirectional state couplings between control cycles 300, 302. In this example, a one-directional state coupling causes a state change in control cycle 300 to effect a state change in control cycle 302, but not vice versa. A bidirectional state coupling can cause a state change in either control cycle 300 to effect a state change in control cycle 302, or vice versa.

With loose coupling, it is also possible to define whether state changes in one control cycle can be initiated independently of state changes or states in another control cycle, or whether such state changes depend on state changes in another control cycle. It is also possible to couple states of one control cycle 300 with other states of more than one other control cycles. Loose coupling also makes it possible to couple a state of a first control cycle with a state of a second control cycle, to couple the state of the second control with a state of a third control cycle, and so on.

Figure 7:
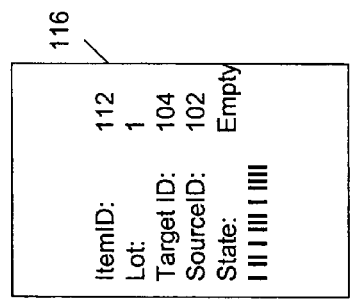
FIG. 7 shows a Kanban card.

As noted above, a Kanban can be a physical device, such as a card, or an electronic element, such as a signal or message. FIG. 7 illustrates a Kanban card 116. Kanban card 116 can include an item identifier (ID) that identifies a requested item, a lot that defines a number of ordered items, a consumerID that identifies a consumer requesting the item, a supplierID that identifies a producer of the item, a state of the underlying Kanban control cycle that defines a state of the control cycle, and a barcode. The barcode can be used to scan the Kanban card and to allow electronic processing of data concerning the item. The barcode also define initiating events, which trigger state changes automatically. That is, data represented by the barcode can trigger state changes, as described herein.

Figure 8:
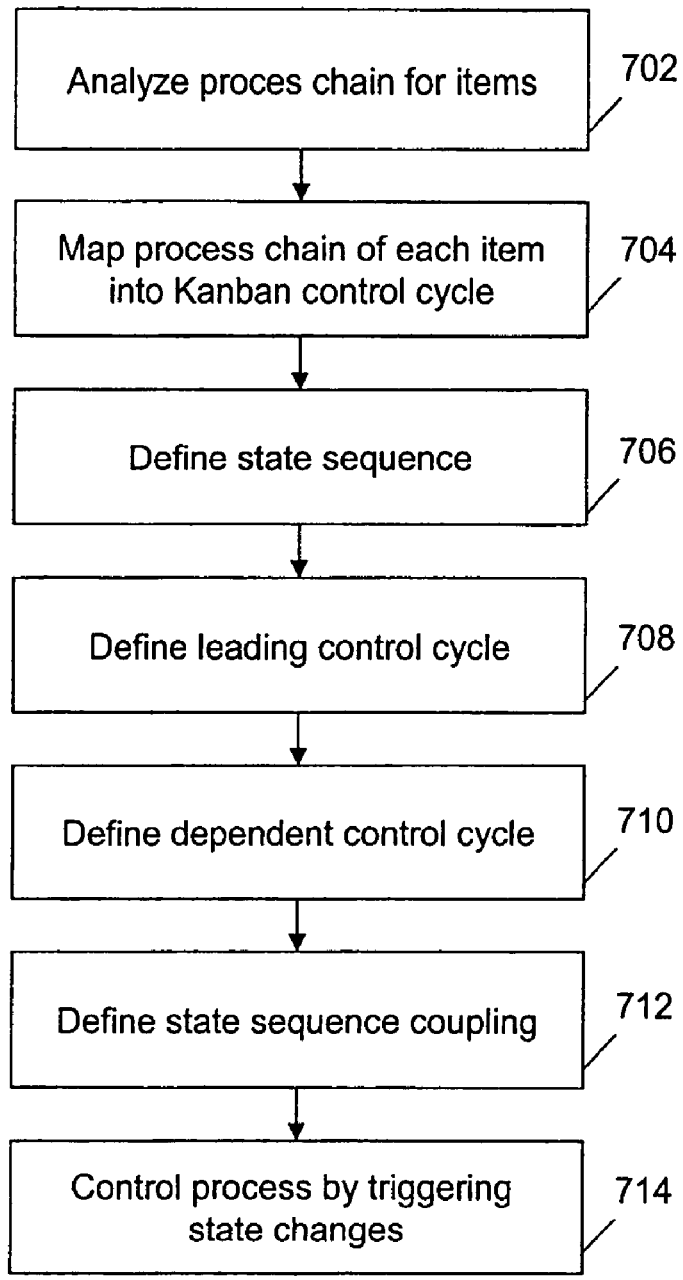
FIG. 8 shows a flowchart of a method for monitoring a supply chain using a Kanban control cycle.

FIG. 8 is flowchart showing a process 800 that uses Kanban control cycles in the manner described herein. In the flowchart, processes of a chain are analyzed (802). A Kanban control cycle is mapped (804) to each item in the process chain. States of the resulting Kanban control cycles are customized (806). During state definition, the process chain can further be mapped into the control cycle by customizing a sequence of states within each control cycle. The state sequence, as described with respect to FIGS. 3 and 4, corresponds to state changes allowed within a control cycle. After customizing the Kanban control cycles, one control cycle is designated (708) as leading control cycle 708. Other control cycles can be designated (710) as dependent control cycle(s).

A state sequence coupling is defined (712) to provide coupling between the leading control cycle and the dependent control cycle. Such a coupling is, for example, illustrated in FIG. 5. Consistency rules can then be defined to perform the consistency checks noted above. The consistency rules can define state changes in the dependent control cycle caused by state sequence couplings. In addition to the actual couplings, the dependent control cycles can be defined in one or more state sequence coupling matrices. In addition, the state sequence coupling may define automatic creation of Kanban cards.

Process 800 and any modifications or enhancements thereto described above (referred to collectively as "the processes") are not limited to use with the hardware and software described above; they may find applicability in any computing or processing environment and with any type of machine that is capable of running machine-readable instructions. The processes can be implemented in digital electronic circuitry, or in computer hardware, firmware, software, or in combinations thereof.

The processes can be implemented via a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Actions associated with the processes can be performed by one or more programmable processors executing one or more computer programs to perform the functions of the processes. The actions can also be performed by, and the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks.

The processes can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the processes, or any combination of such back-end, middleware, or front-end components. The components of the system can be interconnected by any form or medium of digital data communication, e.g., a communication network. Examples of communication networks include a LAN and a WAN, e.g., the Internet.

Activities associated with the processes can be rearranged and/or one or more such steps can be omitted to achieve the same results described herein. All or part of the processes may be fully automated, meaning that they operate without user intervention, or interactive, meaning that all or part of the processes may include some user intervention.

Elements of different embodiments described herein may be combined to form other embodiments not specifically set forth above. Other embodiments not specifically described herein are also within the scope of the following claims.

What is claimed is:

1. A method of modelling a process chain, comprising:
   mapping processes in the process chain to control cycles;
   designating a control cycle in the process chain to be a leading control cycle;
   designating a control cycle in the process chain to be a dependent control cycle;
   defining states for the leading control cycle using a first matrix that defines starting and ending states in the leading control cycle;
   defining states for the dependent control cycle using a second matrix that defines starting and ending states in the dependent control cycle; and
   defining couplings between states in the leading control cycle and the dependent control cycle to produce a model of the process chain, at least one of the couplings causing a state change in the leading control cycle to affect a state change in the dependent control cycle;
   wherein the couplings are defined using a third matrix that relates the first matrix to the second matrix;
   wherein the at least one of the couplings comprises a one-directional coupling in which the state change in the leading control cycle affects the state change in the dependent control cycle;
   wherein at least one of the couplings comprises a bi-directional coupling in which a state change in the leading control cycle or in the dependent control cycle affects, respectively, a state change in the dependent control cycle or the leading control cycle; and
   wherein the third matrix identifies at least some of the couplings as either one-directional or bi-directional.

2. The method of claim 1, wherein the third matrix stores data indicating whether a state change in a control cycle is a necessary predicate for a state change in another control cycle or whether a state change in a control cycle can occur independently of a state change another other control cycle.

3. The method of claim 1, wherein the leading and dependent control cycles are defined in a software system for supporting material flow in the process chain.

4. The method of claim 1, wherein the leading and dependent control cycles comprise Kanban control cycles.

5. The method of claim 1, further comprising defining a consistency rule, the consistency rule ensuring correct relationships between states in at least one of the dependent control cycle and the independent control cycle.

6. The method of claim 1, further comprising defining an error state in at least one of the leading and dependent control cycles.

7. The method of claim 6, further comprising linking an error state of one control cycle with an error state of another control cycle.

8. The method of claim 1, wherein at least one of the states is defined in at least one Kanban card.

9. The method of claim 1, wherein a state sequence is defined by at least one set of states of different control cycles having at least one state coupling type.

10. A computer program product tangibly embodied in an information carrier, the computer program product comprising instructions for use in modelling a process chain, the instructions for causing at least one machine to:
  map processes in the process chain to control cycles;
  designate a control cycle in the process chain to be a leading control cycle;
  designate a control cycle in the process chain to be a dependent control cycle;
  define states for the leading control cycle using a first matrix that defines starting and ending states in the leading control cycle;
  define states for the dependent control cycle using a second matrix that defines starting and ending states in the dependent control cycle; and
  define couplings between states in the leading control cycle and the dependent control cycle to produce a model of the process chain, at least one of the couplings causing a state change in the leading control cycle to affect a state change in the dependent control cycle;
  wherein the couplings are defined using a third matrix that relates the first matrix to the second matrix;
  wherein the at least one of the couplings comprises a one-directional coupling in which the state change in the leading control cycle affects the state change in the dependent control cycle;
  wherein at least one of the couplings comprises a bi-directional coupling in which a state change in the leading control cycle or in the dependent control cycle affects, respectively, a state change in the dependent control cycle or the leading control cycle; and
  wherein the third matrix identifies at least some of the couplings as either one-directional or bi-directional.

11. The computer program product of claim 10, wherein the third matrix stores data indicating whether a state change in a control cycle is a necessary predicate for a state change in another control cycle or whether a state change in a control cycle can occur independently of a state change another other control cycle.

12. The computer program product of claim 10, wherein the leading and dependent control cycles are defined in a software system for supporting material flow in the process chain.

13. The computer program product of claim 10, wherein the leading and dependent control cycles comprise Kanban control cycles.

14. The computer program product of claim 10, further comprising defining a consistency rule, the consistency rule ensuring correct relationships between states in at least one of the dependent control cycle and the independent control cycle.

15. The computer program product of claim 10, further comprising instructions that cause the at least one machine to define an error state in at least one of the leading and dependent control cycles.

16. The computer program product of claim 15, further comprising instructions that cause the at least one machine to link an error state one control cycle with an error state of another control cycle.

17. The computer program product of claim 10, wherein at least one of the states is defined in at least one Kanban card.

18. A system for modelling a process chain, comprising:
  means for mapping processes in the process chain to control cycles;
  means for designating a control cycle in the process chain to be a leading control cycle;
  means for designating a control cycle in the process chain to be a dependent control cycle;
  means for defining states for the leading control cycle using a first matrix that defines starting and ending states in the leading control cycle;
  means for defining states for the dependent control cycle using a second matrix that defines starting and ending states in the dependent control cycle; and
  means for defining couplings between states in the leading control cycle and the dependent control cycle to produce a model of the process chain, at least one of the couplings causing a state change in the leading control cycle to affect a state change in the dependent control cycle;
  wherein the couplings are defined using a third matrix that relates the first matrix to the second matrix;
  wherein the at least one of the couplings comprises a one-directional coupling in which the state change in the leading control cycle affects the state change in the dependent control cycle;
  wherein at least one of the couplings comprises a bi-directional coupling in which a state change in the leading control cycle or in the dependent control cycle affects, respectively, a state change in the dependent control cycle or the leading control cycle; and
  wherein the third matrix identifies at least some of the couplings as either one-directional or bi-directional.

19. The system of claim 18, wherein the leading and dependent control cycles are defined in a software system for supporting material flow in the process chain.

20. The system of claim 18, wherein the leading and dependent control cycles comprise Kanban control cycles.

21. The system of claim 18, wherein the third matrix stores data indicating whether a state change in a control cycle is a necessary predicate for a state change in another control cycle or whether a state change in a control cycle can occur independently of a state change another other control cycle.

* * * * *